United States Patent
Purdom et al.

(10) Patent No.: US 6,562,107 B2
(45) Date of Patent: May 13, 2003

(54) BUBBLE TRAP

(75) Inventors: Geoff Purdom, Acton, MA (US); Daniel Karrer, Wald (CH); Ian Rayner, Waltham, MA (US)

(73) Assignee: Millipore Corporation, Billerica, MA (US)

( * ) Notice: Subject to any disclaimer, the term of this patent is extended or adjusted under 35 U.S.C. 154(b) by 46 days.

(21) Appl. No.: 09/824,274

(22) Filed: Apr. 2, 2001

(65) Prior Publication Data
US 2001/0042441 A1 Nov. 22, 2001

(30) Foreign Application Priority Data
May 19, 2000 (GB) .............................................. 0012042

(51) Int. Cl.[7] .............................................. B01D 19/00
(52) U.S. Cl. .............................. 95/241; 96/179; 96/219; 210/188
(58) Field of Search .......................... 210/188; 95/241, 95/260, 262; 96/219, 179

(56) References Cited

U.S. PATENT DOCUMENTS

| | | | |
|---|---|---|---|
| 3,074,645 A | * | 1/1963 | Main |
| 3,581,464 A | * | 6/1971 | Bhuta et al. |
| 4,102,655 A | * | 7/1978 | Jeffery et al. |
| 4,344,777 A | | 8/1982 | Siposs |
| 4,806,135 A | | 2/1989 | Siposs |
| 4,997,464 A | * | 3/1991 | Kopf |
| 5,268,077 A | | 12/1993 | Bubik et al. |
| 5,468,388 A | * | 11/1995 | Goddard et al. |
| 5,503,801 A | * | 4/1996 | Brugger |
| 5,674,199 A | * | 10/1997 | Brugger |
| 5,800,597 A | * | 9/1998 | Perrotta et al. |
| 5,931,990 A | * | 8/1999 | Andrews |
| 5,989,318 A | * | 11/1999 | Schroll |
| 6,019,824 A | * | 2/2000 | Schnell |
| 6,117,342 A | * | 9/2000 | Schnell et al. |
| 6,206,954 B1 | | 3/2001 | Schnell et al. |
| 6,251,167 B1 | * | 6/2001 | Berson |
| 2001/0042441 A1 | * | 11/2001 | Purdom et al. |

FOREIGN PATENT DOCUMENTS

| EP | 0 501 144 A1 | 1/1992 |
|---|---|---|
| GB | 2061 755 A | 5/1981 |
| GB | 2212739 A | 2/1989 |

OTHER PUBLICATIONS

Copy of British Search Report dated Sep. 4, 2001.
Copy of the Standard Search Report from the case filed in Great Britain.

* cited by examiner

Primary Examiner—Duane S. Smith
(74) Attorney, Agent, or Firm—John Dana Hubbard; Paul J. Cook

(57) ABSTRACT

A bubble trap having a cylindrically symmetrical chamber, a filter covering an outlet and offset from the axis of the chamber, an inlet with a plurality of vertically aligned orifices, the orifices arranged to produce circumferential flow within the chamber. Bubbles in the liquid coalesce on the filter and are removed. A method of removing bubbles is also disclosed.

18 Claims, 1 Drawing Sheet

BUBBLE TRAP

Figure 1:
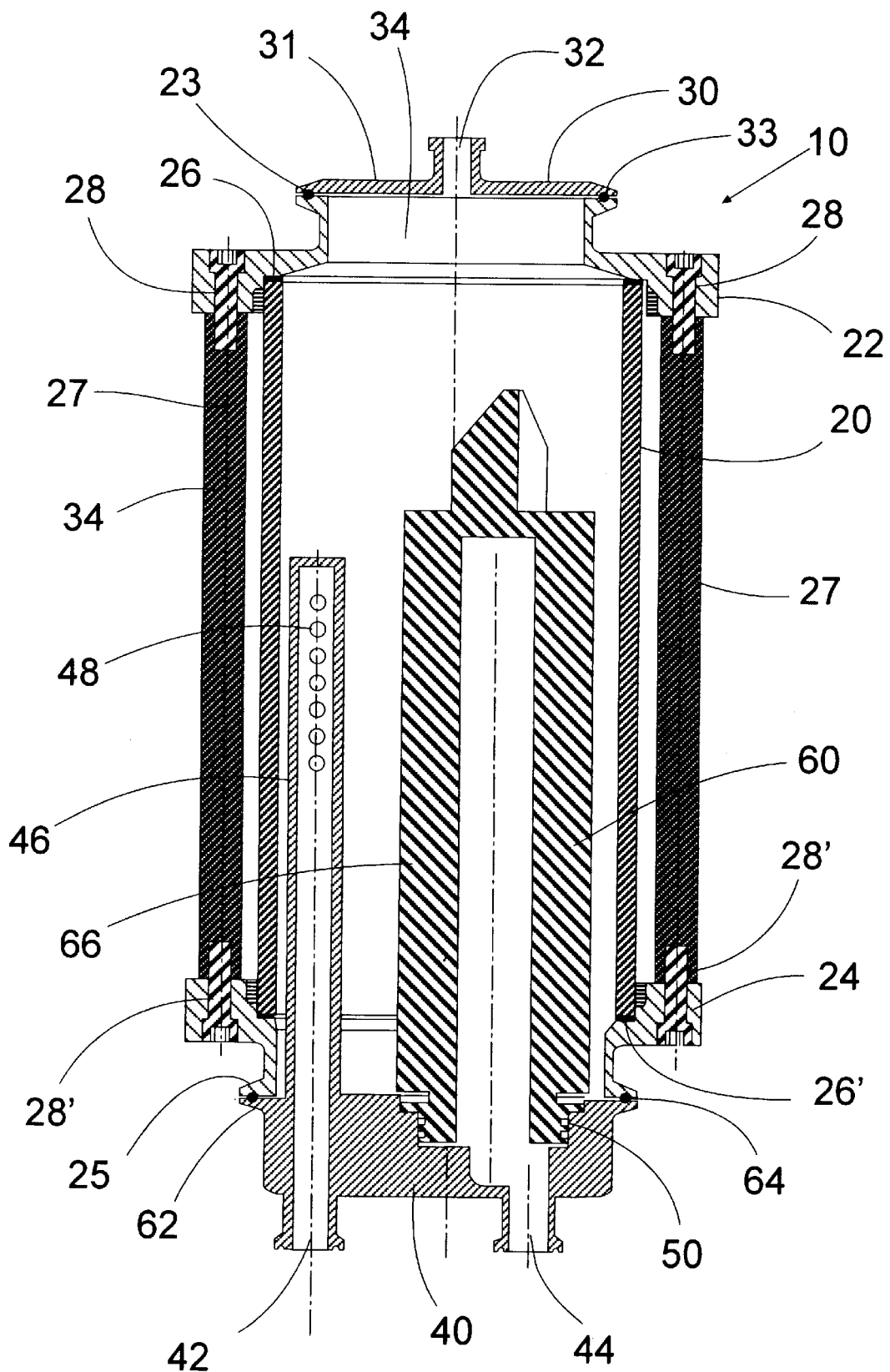

The present invention relates to a bubble trap for removing gas bubbles and, in some embodiments, also solids from a flowing liquid.

BACKGROUND OF THE INVENTION

Bubble traps are commonly used where there is a need to remove gas bubbles from a flowing liquid, for example, in hydraulic circuits or in liquid chromatography. The presence of gas bubbles in the flowing liquid would be detrimental to the action of the functional parts of a hydraulic system or the integrity of the solid phase of a chromatography column.

Filters are commonly used where there is a need to remove solids from a flowing liquid, for example, in liquid chromatography. The solid may be, for example, an undissolved component of the chromatography column buffer or a solid present within the liquid sample. This is especially likely if the liquid sample is a biological sample.

In U.S. Pat. No. 4,806,135 a bubble trap is described for removal of emboli from blood prior to transfusion. The device allows blood to pass through a filter arranged so that solid components, such as red blood cells, pass through the filter but entrained bubbles do not. This separation is achieved by introducing the blood in a tangential direction relative to the axis of rotation of the chamber. The introduction of the blood is above the level of the filter and with a low velocity so the bubbles rise from the blood as the blood rotates within the body of the bubble trap before reaching a filter below the level of the fluid inlet. The filter can be a wide mesh filter as it is not required to trap bubbles.

Frequently there is a need to remove gas bubbles efficiently from a rapidly flowing liquid which U.S. Pat. No. 4,806,135 cannot perform. In other cases the removal of both gas bubbles and solids from a rapidly flowing liquid is required. Typically the removal of both gas bubbles and solid components from a rapidly flowing liquid has necessitated the use of a filter and a bubble trap arranged in series, each independently performing its function.

SUMMARY OF THE INVENTION

There is therefore a need for simple compact devices that can perform the removal of bubbles, or both bubbles and solids, from a rapidly flowing liquid.

The flow of the liquid is directed from the inlet to impinge upon the barrier which causes bubbles present within the flow of the liquid to coalesce on the surface of the barrier and then float to the top of the bubble trap.

When the bubble trap of the invention combines the functions of a filter with a bubble trap the barrier takes the form of a filter covering the outlet. The bubble trap may have a plurality of filters and outlets. The filter has openings of a diameter which prevent the passage of bubbles through the filter. The surface tension of the liquid covering the filter openings is quite strong and it requires a considerable trans-filter pressure differential to force the bubbles through the filter openings. The bubbles may then aggregate before they float free from the surface of the filter or be dislodged by the flow of the liquid onto the filter surface.

The upper and lower levels of the liquid within the chamber may be regulated by a sensor to be maintained above the top of the filter.

The bubble trap is arranged to avoid vortex formation in the liquid as vortex formation could lower the liquid level sufficiently to allow air through the filter.

Conveniently the chamber is generally cylindrical in which case vortex formation in the chamber can be avoided by positioning the filter, and optionally filter outlet, off the central axis of the chamber.

Preferably the inlet has one or more vertically aligned orifices directed to produce circumferential flow of the liquid. Impingement of the liquid upon the filter also acts to dislodge coalesced bubbles on the filter surface.

An inlet with a plurality of orifices provides circumferential flow of the liquid throughout the entire height of the filter such that the liquid impinges more effectively upon the filter and ensures good vertical distribution of liquid over a wide range of flow rates.

Conveniently, the one or more orifices are selected from slits, holes and nozzles or any of the types of orifice known to those skilled in the art.

Preferably the filter openings are less than 1.2 $\mu$m. A typical flow rate for the bubble trap would be 5–40 liters/min. A low liquid residence time is desirable, such a residence time is typically 30–3 seconds. The effective size of the opening is dependent upon several factors, for example, the viscosity of the liquid and the internal pressure of the bubble chamber.

Preferably if sterile filtration is required the opening size should be less than 0.22 $\mu$m.

Preferably the filter may be a removable cartridge filter. The size of the cartridge filter, and of the inlet, reduce the interior volume of the chamber so reducing the stagnant holding volume of the chamber. Such cartridge filters are widely available having a wide range of opening sizes and structural tolerances. Such filter cartridges are available in a number of standard lengths which can be used interchangeably within the limitation of the maximum size of the bubble trap chamber. For example, MILLIGARD™ Standard and MILLIGARD™ Low Protein-Binding Cartridge filters may be used, both manufactured by Millipore Corporation, US. Preferably these filters may be either 4" or 10" in height.

The presence of the filter in the bubble trap device results in a small interior volume to minimise the stagnant or holding volume. It is capable of sterile operation, if such is required, and has a minimum number of easy-to-produce components. The simple construction reduces the need for complex valving arrangements and associated hardware. The general design of the device is sanitary to enable cleaning of the device with, for example, sanitizing chemicals or steam. The replacement of the cartridge is possible whilst remaining sterile.

IN THE DRAWINGS

A preferred embodiment of the invention will now be described with reference to the accompanying drawing, in which:

FIG. 1 is a vertical cross-sectional view through a bubble trap in accordance with the invention.

DETAILED DESCRIPTION OF THE INVENTION

The bubble trap 10 comprises a cylindrical tube 20 secured between an upper securing plate 22 and a lower securing plate 24. A gasket 26 is used to produce a fluid tight seal between the cylindrical tube 20 and the upper securing plate 22. A gasket 26' is used to produce a fluid tight seal between the cylindrical tube 20 and the lower securing plate 24. The cylindrical tube 20 is preferably made from clear material such as TPX resin, glass or PERSPEX resin to allow the user to view the inside of the cylindrical tube 20; or may be made from stainless steel. The securing plates may be made from stainless steel.

The upper securing plate 22 and the lower securing plate 24 are held in place by connecting rods 27 each secured by an upper screw 28 and a lower screw 28'. In the preferred embodiment there are six connecting rods 27, two of which are shown in FIG. 1.

A cover 30 having a gas outlet 32 is sealed to the neck 34 of the upper securing plate 22. The cover 30 is removably attached to the upper securing plate 22 by a clamp (not shown) securing an upper securing plate flange 23 to a cover flange 31. A gasket 33 is used to produce a fluid tight seal between the cover 30 and the upper securing plate 22.

In the preferred embodiment the neck 34 of the upper securing plate 22 has a large diameter which allows a hand to access the inside of the cylindrical tube 20. The access may be, for example, to replace a filter cartridge 60. The gas outlet 32 allows the exit of accumulated gas from the bubble trap 10. If removal of solids is not required, the filter can be replaced by a barrier to present a surface for coalescence of the bubbles in the fluid flow.

Removably attached to the lower securing plate 24 is a base unit 40. The base unit 40 has an inlet passage 42 and an outlet passage 44. The base unit 40 is formed to provide an inlet fitting 46 mounted on the upper surface of the base unit 40 and arranged so that the inlet fitting 46 is off the central axis of the cylindrical tube 20 and is not in contact with the inner wall of the cylindrical tube 20. The inlet fitting 46 has one or more jetting orifices 48. The jetting orifices may be holes or slots or any means for directing fluid flow. The jetting orifices 48 are arranged so that the liquid flows tangentially in the cylindrical tube 20. The delivery of the liquid may be pulsatile if a peristaltic pump (not shown) is used.

The base unit 40 is removably attached to the lower securing plate 24 by a clamp (not shown) securing a lower securing plate flange 25 to a base unit flange 62. Sandwiched between the base unit 40 and the lower securing plate is a gasket 64 which makes the assembly fluid tight.

The base unit 40 is arranged so that the outlet passage 44 has a filter securing means 50 which allows a filter 60, in this case a removable cartridge filter, to be secured to the base unit 40.

In the preferred embodiment the filter 60 is off the central axis of the chamber. The filter securing means 50 is positioned so that the filter 60 is not in contact with the inner wall of the cylindrical tube 20. This position of the filter 60 helps to avoid the formation of a liquid vortex within the cylindrical tube 20.

A sensor (not shown) detects the upper and lower level of the liquid in the cylindrical tube 20 so that the level of the liquid is controlled to be above the filter 60 by controlling venting of accumulated gas from the outlet 32. The inlet fitting 46 is arranged such that the jetting orifices 48 jet the liquid onto the filter 60 below the top of the filter 60.

The bubble trap 10 has a low stagnant volume due to the arrangement of the inlet fitting 46 and the filter 60 and allows sanitary operation having no dead spaces. An advantage of the present embodiment is that there is only one inlet passage 42, one gas outlet 32 and one outlet passage 44 consequently the need for complex valving and hardware arrangements is reduced In operation the filter surface 66 does not allow bubbles present in the liquid flow to pass through the filter 60. The bubbles coalesce on the filter surface 66 and then float to the surface of the liquid, exiting via the gas outlet 32. Solid material present in the liquid is also filtered by the filter 60. The present invention thus acts to remove both solids and gas bubbles from a liquid flow.

If no filtering is required, a solid flow barrier, optionally with surface texture to encourage bubble formation, can be located in the bubble trap instead of the filter, with the outlet positioned to allow liquid to exit the bubble trap.

What is claimed is:

1. A bubble trap for removing gas bubbles from a flowing liquid compressing a chamber having an inlet, an outlet and a barrier, and wherein the barrier is a filter which covers the outlet and prevents the passage of bubbles through to the outlet and the filter openings are less than 1.2 microns.

2. A bubble trap according to claim 1 wherein the chamber is generally cylindrical and vortex formation in the chamber is avoided by positioning the barrier off the central axis of the chamber.

3. A bubble trap according to claim 1 wherein the inlet has one or more orifices selected from the group consisting of slits, holes and nozzles.

4. A bubble trap according to claim 1 wherein the chamber is generally cylindrical and vortex formation in the chamber is avoided by positioning the barrier off the central axis of the chamber and the inlet has one or more orifices selected from the group consisting of slits, holes and nozzles.

5. A bubble trap according to claim 1 wherein the barrier is a filter which covers the outlet and prevents the passage of bubbles through to the outlet and the filter is a removable cartridge filter.

6. A method of removing gas bubbles and solids from a flow of liquid comprising forming a directed flow of liquid from an inlet to a barrier wherein the barrier is in the form of a filter which covers an outlet and prevents the passage of bubbles through to the outlet and the filter openings are less than 1.2 microns.

7. A method of removing gas bubbles from a flow of liquid comprising forming a directed flow of liquid from an inlet to a barrier that is in the form of a filter which covers an outlet and prevents the passage of bubbles through to the outlet and the filter openings are less than 1.2 microns.

8. The method of claim 7 wherein the liquid is used in a chromatography column.

9. A bubble trap comprising a tube secured between an upper plate and a lower plate so as to form a fluid tight seal between the tube and the upper and lower plates, the upper and lower plates being secured to each other, a cover secured to the upper plate, the cover containing a gas outlet, a base unit secured to the lower plate, the base unit containing a fluid inlet passage and a fluid outlet passage, an inlet fitting extending out of the base plate inlet passage and into the tube, the inlet fitting being off a central axis of the tube and not in contact with an inner wall of the tube, the outlet passage containing a barrier securing means that allows a barrier to be secured to the base unit adjacent the outlet and a barrier secured to the barrier securing means and the inlet fitting containing one or more orifices for directing a flow of fluid from the inlet fitting to impinge upon the barrier.

10. The bubble trap of claim 9 wherein the barrier is in the form of a filter having a surface tension sufficiently high so as to not allow gas bubbles to pass through the filter at normal operating transfilter pressure differential.

11. The bubble trap of claim 9 further comprising a sensor for determining the level of fluid within the tube so that the level of fluid is controlled to be above the barrier.

12. The bubble trap of claim 9 wherein the orifices are jetting orifices selected from the group consisting of holes, slits, nozzles and slots and the orifices being arranged such that that the fluid exiting the orifices direct fluid onto the barrier below a top of the barrier.

13. The bubble trap of claim 9 wherein the orifices are jetting orifices selected from the group consisting of holes, slits, nozzles and slots and the orifices being arranged such that that the fluid exiting the orifices direct fluid tangentially in the tube and directly on to the barrier.

14. The bubble trap of claim 9 wherein the orifices are jetting orifices selected from the group consisting of holes, slits, nozzles and slots, the orifices being arranged such that that the fluid exiting the orifices direct fluid tangentially in the tube and directly on to the barrier and the orifices being arranged such that that the fluid exiting the orifices direct fluid onto the barrier below a top of the barrier.

15. A bubble trap for removing gas bubbles from a flowing liquid comprising a chamber having an inlet, an outlet and a barrier, wherein the barrier is a filter which covers the outlet and prevents the passage of bubbles through to the outlet and the filter openings are less than 0.22 micron to effect sterile filtration of the liquid.

16. The bubble trap of claim 1 wherein the filter openings are less than 0.22 micron.

17. The bubble trap of claim 6 wherein the filter openings are less than 0.22 micron.

18. The bubble trap of claim 7 wherein the filter openings are less than 0.22 micron.

* * * * *